United States Patent [19]
Yamamoto et al.

[11] Patent Number: 5,475,082
[45] Date of Patent: Dec. 12, 1995

[54] USE OF POLY(ALKYLPYRIDINE-2,5-DIYL)

[75] Inventors: Takakazu Yamamoto, Yokohama; Tsukasa Maruyama, Machida, both of Japan

[73] Assignee: Tokyo Institute of Technology, Tokyo, Japan

[21] Appl. No.: 435,613

[22] Filed: May 5, 1995

Related U.S. Application Data

[60] Division of Ser. No. 68,380, May 27, 1993, Pat. No. 5,436,316.

[30] Foreign Application Priority Data

Aug. 28, 1992 [JP] Japan ..................... 4-230168

[51] Int. Cl.$^6$ ................................. C08G 73/00
[52] U.S. Cl. .................. 528/422; 29/623.1; 429/192; 429/212; 429/213
[58] Field of Search ............ 528/422; 29/623.1; 429/192, 212, 213

[56] References Cited

PUBLICATIONS

*Synthesis*, Sep. 1984, pp. 736–738, "A Convenient Synthesis of Bipyridines by Nickel–Phosphine Complex–Mediated Homo Coupling of Halopyridines", Tiecco et al.
Yamamoto et al., "A Soluble Poly(arylene) . . . ", *Chemistry Letters*, The Chem. Soc. Jap. (1988) pp. 153–154.
Maruyama et al., "Preparation and Properties . . . ", *Chemistry Letters*, The Chem. Soc. Jap. (1992) pp. 643–646.
Maruyama et al., "π–Conjugated Soluble . . . ", *Macromolecules*, Am. Chem. Soc., vol. 26, No. 15 (1993) pp. 4055–4057.

*Primary Examiner*—James J. Seidleck
*Assistant Examiner*—Terressa Mosley
*Attorney, Agent, or Firm*—Spencer, Frank & Schneider

[57] ABSTRACT

A process of producing a device which is one of a battery, an electrochromic device, an electronic device, an n-type conductor, or an electroluminescent device includes fabricating at least one constituent of the device from a polymer comprised of poly(alkylpyridine-2,5-diyl) having a chemical formula:

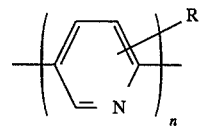

wherein R is an alkyl group having not less than 3 carbon atoms, and n is a degree of polymerization and is not less than 30. Preferably R is an alkyl group having 4 to 20 carbon atoms and n is a degree of polymerization and is not less than 30. Most preferably R is an alkyl group selected from the group consisting of a hexyl group, a pentyl group, an octyl group, a decyl group, and a dodecyl group.

15 Claims, 1 Drawing Sheet

*Infrared absorption spectrum* ( cm$^{-1}$ )

FIG._1
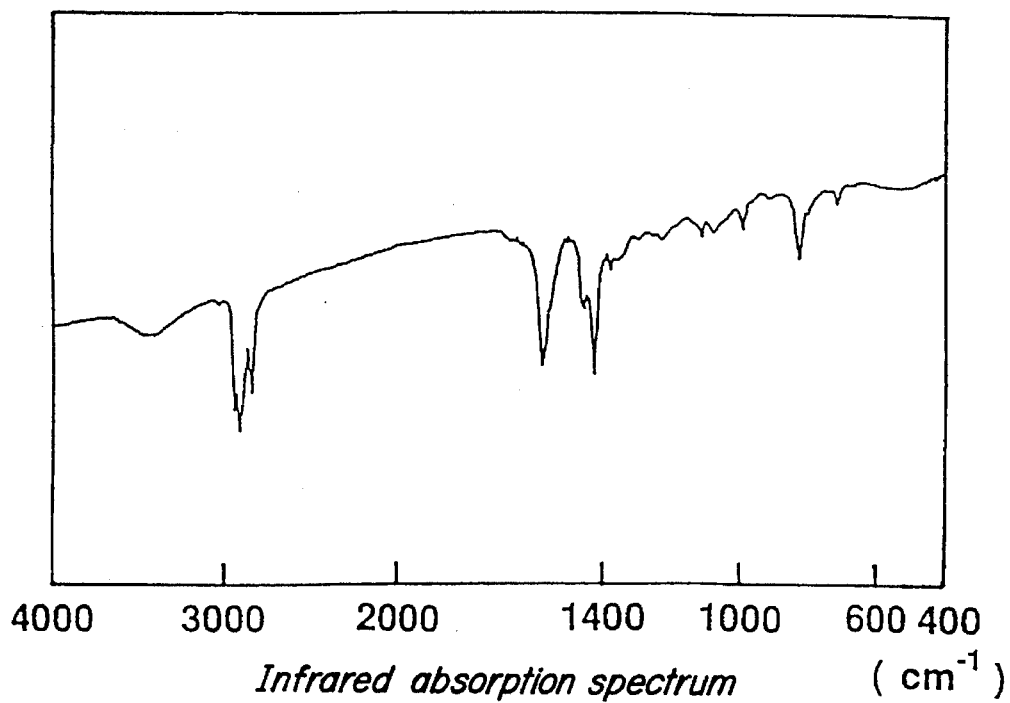
Infrared absorption spectrum ($cm^{-1}$)
FIG._2
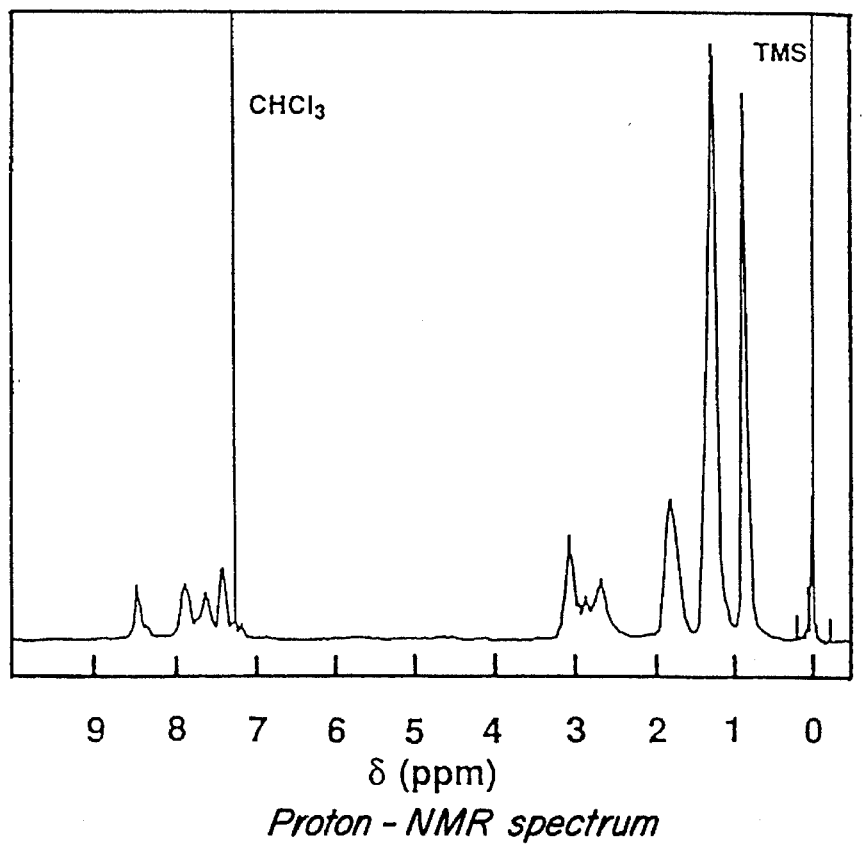
Proton-NMR spectrum

USE OF POLY(ALKYLPYRIDINE-2,5-DIYL)

This is a division of application Ser. No. 08/068,380, filed May 27, 1993, U.S. Pat. No. 5,436,316.

TECHNICAL FIELD

This invention relates to a poly(alkylpyridine-2,5-diyl) which is a novel conductive macromolecule, a manufacturing process of the same and its applications. The polymer contains bivalent residues of 2,5-dihalogenated alkylpyridine wherein halogen atoms at 2-position and 5-position are removed as the repeating unit. The polymer, which presents a π-conjugated system along with its principal chain, is conductive after an electrochemical doping process, stable in the air and soluble into various organic solvents.

BACKGROUND ART

Recently, macromolecule compounds having a π-conjugated system are appreciated as materials utilizing the electrolytic and optical function. In these macromolecule compounds having the π-conjugated system, π electrons in the system are directed in one dimension along with the principal chain of the macromolecule. Therefore, electrolytic anisotropy and optical anisotropy are shown between one direction along with the principal chain and the other direction perpendicular to said one direction.

It is necessary to orientate the principal chain of the macromolecule in a predetermined direction for utilizing the electrolytic anisotropy and optical anisotropy effectively. However, these macromolecules are stiff, insoluble and hard to melt, because the π electrons are directed in one dimention along with the principal chain. Therefore, it is difficult to give a predetermined shape to the macromolecule and to orientate the principal chain in a predetermined direction.

As these conductive materials having the π-conjugated system along with the principal chain, various compounds such as shown below are known.

(1) Polyacethylene

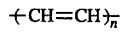

(2) Poly-p-phenylene

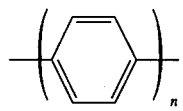

(3) Polythiophene

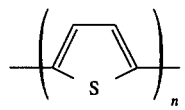

(4) Polypyrrole

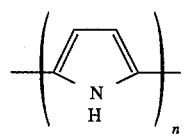

-continued (5) Polypyridine

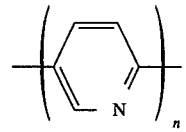

However, because most of the known conductive macromolecules having the π-conjugated system are insoluble to organic solvents etc. and hard to melt, an effective method for processing them has not been found. It is rather difficult to mold and give a predetermined shape to the known macromolecules. Therefore, only limited applications have been found for the macromolecules and the unique functions of them have not been utilized effectively.

To solve the above problems, it has been attempted to introduce a substitution group into the aromatic ring of polythiophene, poly-p-phenylene, polypyrrole or the like for improving the solubility of these compounds to the organic solvents.

Moreover, the above known macromolecules become only p-type conductor by oxidation.

Therefore, it is desired to develop materials having properties not shown in the prior conductive macromolecules by modifying the chemical structures of them. For example, it is desired to develop a π-conjugated conductive macromolecules indicating n-type conductivity other than p-type conductivity which has already obtained by the prior conductive macromolecules. Such conductive macromolecules indicating n-type conductivity can be used for semiconductor devices.

On the other hand, it is easy to obtain a n-type conductor by reducing polypyridine shown above. However, polypyridine is soluble only to limited solvents such as formic acid or concentrated sulfuric acid and therefore its application is very limited. Moreover, the molecular weight of polypyridine is not large enough for preparing strong films made of polypyridine and therefore application of a polypyridine film is very limited.

DISCLOSURE OF INVENTION

Considering these background arts, the inventors of the present invention have searched for a novel conductive macromolecule having a novel molecular structure to solve the above problems.

It is an object of the present invention to provide a novel macromolecule which has a molecular weight large enough for preparing a strong shaped body such as a film, an excellent heat-resistivity and solubility to various organic solvents.

It is another object of the invention to provide a novel macromolecule wherein it is possible to control depolarization effect and an electrochemical oxidation-reduction potential.

It is another object of the invention to provide a novel macromolecule which may be utilized as a predetermined shape such as a fiber, a film or the like.

It is another object of the invention to provide a novel macromolecule which may be utilized as conductive materials of n-type conductor or the like, materials for batteries, materials for electrochromic devices, materials for electronic devices such as transistors or diodes.

The present invention provides poly(alkylpyridine-2,5-diyl) having the chemical formula (6) as follows:

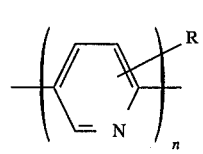
(6)

In the chemical formula (6), 'R' is an alkyl group having not less than 3 carbon atoms, 'n' is a degree of polymerization and is not less than 30. When the degree of polymerization (n) is less than 30, the poly(alkylpyridine-2,5-diyl) may lack a substantial function as a polymer. The inventors prepared the poly(alkylpyridine-2,5-diyl) of the invention as described below having the degree of polymerization (n) of about 230, and confirmed the excellent properties and the applicability of the polymer in experiments described below. As a matter of course, the preparation and the application of the polymer having the degree of polymerization more than 230 may be expected.

Moreover, 'R' is an alkyl group having not less than 3 carbon atoms, for example, hexyl group, pentyl group, octyl group, decyl group, dodecyl group etc. When the number of the carbon atoms in the alkyl group 'R' is less than 3, the polymer is insoluble to usual organic solvents, therefore the number of the carbon atoms in the alkyl group must be 3 or more. The number of the carbon atoms in the alkyl group may preferably be 4 to 20, and more preferably be 4 to 15.

The poly(alkylpyridine-2,5-diyl) of the invention contains the above alkyl group (R), having a relatively long chain, in the repeating unit of the polymer and therefore have a molecular weight large enough (not less than 10,000) for preparing a strong shaped body such as a film.

In the following compound (7), a hydrogen atom at any position of pyridine is replaced by the alkyl group (R).

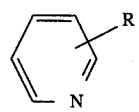
(7)

In the above formula (7), 'R' is an alkyl group having not less than 3 carbon atoms. If a hydrogen atom at 2-position and a hydrogen atom at 5-position are replaced by a halogen atom respectively in the above formula (7), 2,5-dihalogenated alkylpyridine having the following formula (8) is obtained.

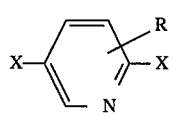
(8)

In the above formula (8), 'R' is an alkyl group having not less than 3 carbon atoms and 'X' is a halogen atom. The poly(alkylpyridine-2,5-diyl) of the invention is manufactured by reacting 2,5-dihalogenated alkylpyridine with zerovalent nickel complexes.

2,5-Dihalogenated alkylpyridine having the above formula (8) may be obtained by the following method.

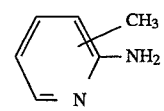
(9)

2-amino-methylpyridine (manufactured by Tokyo Kasei corporation) having the above formula (9) is reacted with n-butyllithium and trimethylsilyl chloride in tetrahydrofuran to give the compound having the following formula (10).

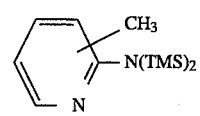
(10)

This compound is then reacted with lithium diisopropylamide and alkyl halide (the alkyl group in the alkyl halide contains carbon atoms not less than 2) in tetrahydrofuran to replace hydrogen of the methyl group in the compound of the formula (10) by the alkyl group (R') in the alkyl halide (R'X).

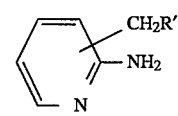
(11)

In the above formula (11), 'R'' is an alkyl group having not less than 2 carbon atoms; the N(TMS)$_2$ group in the above formula (10) is converted to the NH$_2$ group in the above formula (11) during the work using HCl.

2-amino-alkylpyridine compound as shown in the above formula (11) is then subjected to a first halogenation step using a halogen or a halogen compound in ethanol, sodium hydroxide to obtain 2-amino-5-halogenated-alkylpyridine as shown in the following formula (12).

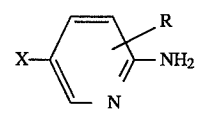
(12)

In the above formula (12), 'R' is an alkyl group having not less than 3 carbon atoms and 'X' is a halogen atom.

2-amino-5-halogenated-alkylpyridine is then subjected to a second halogenation step using a halogen or a halogen compound is hydrogen halide, sodium nitrite, sodium hydroxide to obtain 2,5-dihalogenated alkylpyridine as shown in the formula (8) used in the manufacturing process of the poly(alkylpyridine-2,5-diyl) of the invention.

Moreover, the polymer of the invention may be manufactured by subjecting 2,5-dihalogenated alkylpyridine to a electrolytic reduction reaction in the presence of a compound containing a transition metal such as nickel, palladium.

Moreover, the polymer of the invention may be manufactured by subjecting 2,5-dihalogenated alkylpyridine to a dehalogenation polycondensation reaction by using magnesium (Mg) or zinc (Zn) in the presence of a compound containing a transition metal such as nickel, palladium.

The novel poly(alkylpyridine-2,5-diyl) of the invention contains the alkyl group having 3 or more carbon atoms introduced in its pyridine ring. Because of the special effect of the alkyl group having a relatively long carbon-carbon chain, the polymer of the invention has a molecular weight large enough for preparing a strong shaped body such as a film or a fiber, an excellent heat-resistivity, high stability in the air and solubility to various organic solvents. Therefore, the polymer may be utilized in many application fields wherein the prior art conductive macromolecules are not utilized. It is possible to dissolve the polymer of the invention into the suitable organic solvents for preparing a solution and to obtain a fiber, a film etc. by drying and shaping the solution. Moreover, the polymer of the invention indicates clear color-change by a chemical or electrochemical reduction and becomes a n-type conductor. Such surprising properties are not shown in the prior art conductive macromolecules.

Then, the polymer of the present invention, which is a π-conjugated conductive macromolecule, can be synthesized easily and at a low cost.

In other words, the novel poly(alkylpyridine-2,5-diyl) of the invention, characterized by the excellent properties, can be shaped as a strong fiber or film after dissolving the polymer into the organic solvent. Moreover, the polymer can be reduced by using a reducing agent or by a chemical or electrochemical doping. Therefore, the polymer of the invention may be utilized as materials for batteries, materials for electrochromic devices, materials for electronic devices such as transistors or diodes, and conductive materials of n-type conductor or the like.

BRIEF DESCRIPTION OF DRAWINGS

FIG. 1 is a chart showing an infrared absorption spectrum of an example of the polymer according to the invention.

FIG. 2 is a chart showing a proton NMR spectrum of an example of the polymer according to the invention.

DETAILED DESCRIPTION OF THE INVENTION

The poly(alkylpyridine-2,5-diyl) according to the present invention can be obtained by reacting a 2,5-dihalogenated alkylpyridine, with an equimolar amount or excess of a zero-valent nickel compound added thereto in an organic solvent, followed by dehalogenation. A preferable reaction temperature ranges between room temperature and about 70° C. The reaction completes within about 2~48 hours. As the above organic solvent, for example, N,N-dimethylformamide, acetonitrile, toluene, tetrahydrofuran or the like can be employed.

The zero-valent nickel compound withdraws halogens from halogenated aromatic compounds and causes a coupling reaction between the aromatic groups [for example, see "Synthesis", p. 736 (1984)]. This reaction is represented by the following equation (13):

$$Ar-X + Ar'-X + NiL_m \rightarrow Ar-Ar' + NiX_2L_m \quad (13)$$

wherein Ar and Ar' represent an aromatic group, X represents a halogen atom, L represents a neutral ligand and hence $NiL_m$ represents a zero-valent nickel compound.

Accordingly, if an aromatic compound having two halogens in the molecule, such as 2,5-dihalogenated alkylpyridine, is reacted with an equimolar or excess of a zero-valent nickel compound, the polymer of the present invention can be obtained by the dehalogenation polycondensation reaction shown in the following equations (14) and (15):

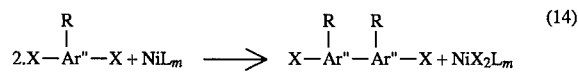

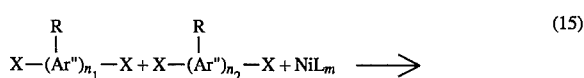

wherein

represents 2,5-dihalogenated alkylpyridine, R represents a long chain alkyl group having not less than 3 carbon atoms, and X represents a halogen.

In the above-described reaction, as the zero-valent nickel compound, those synthesized in a reaction system, so to speak, in situ, immediately before conducting a polymerization reaction can be used directly. Alternatively, preliminarily synthesized and isolated ones also can be used. Such a zero-valent nickel compound is, for example, a nickel complex produced by a reduction reaction or a ligand interchange reaction in the presence of a neutral ligand. As a typical example of the neutral ligand, mention may be made of 1,5-cyclooctadiene, 2,2'-bipyridine, triphenylphosphine or the like.

Alternatively, the poly(alkylpyridine-2,5-diyl) shown in the chemical formula (6) can be obtained by another process wherein the 2,5-dihalogenated alkylpyridine shown in the above chemical formula (8) undergoes a dehalogenation reaction when it is subjected to an electrochemical reduction reaction in the presence of a divalent nickel compound. Namely, when a divalent nickel compound is electrochemically reduced in an electrolytic cell, a zero-valent nickel compound is produced by the reaction shown in the following chemical formula (17).

Accordingly, when an aromatic compound having two halogens in the molecule, namely, a 2,5-dihalogenated alkylpyridine is electrochemically reduced in the presence of a divalent nickel compound, the polymer shown in the chemical formula (6) can be obtained according to the reaction shown in the chemical formula (17) and the reactions shown in the following formulae (18)–(20) consequently taking place, wherein the $Ni^OL_m$ producing in the reaction system is involved.

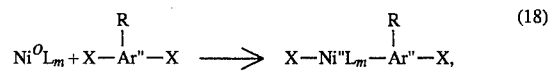

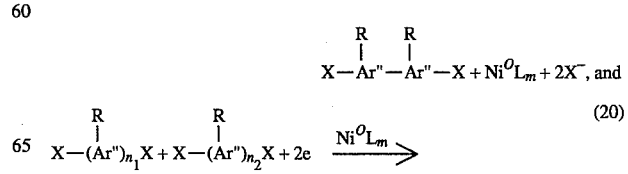

-continued

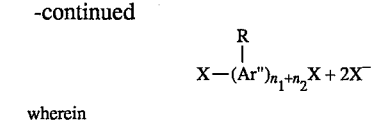

wherein

(21)

represents a 2,5-dihalogenated alkylpyridine, R represents a long chain alkyl group having not less than 3 carbon atoms and, where X is a halogen.

The electrolysis may be conducted generally in the following conditions: namely, polar solvents such as N,N-dimethylformamide and acetonitrile are used as the solvent, salts such as tetraethylammonium perchlorate and tetraethylammonium tetrafluoroborate as the supporting electrolytic salt are dissolved to prepare an electrolyte and electrodes such as a platinum electrode, ITO transparent electrode and graphite electrode are employed as the electrode. The 2,5-dihalogenated alkylpyridine and divalent nickel complex are dissolved in the electrolyte and the electrochemical reduction is conducted at a reduction potential of the divalent nickel complex, for example, at $-1.7$ V vs Ag/Ag$^+$ in the case of tris(2,2-bipyridine)-nickel salt.

Moreover, in another method, poly(alkylpyridine-2,5-diyl) having the chemical formula (6) may be manufactured by subjecting 2,5-dihalogenated alkylpyridine having the chemical formula (8) to a dehalogenation polycondensation reaction by using magnesium or zinc in the presence of a divalent nickel compound. In other words, zero valent nickel compound may be prepared by a reducing reaction with magnesium or zinc and the polymerization reaction is eventually expressed as shown in the formula (22).

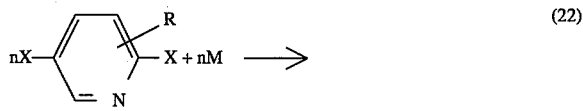

(22)

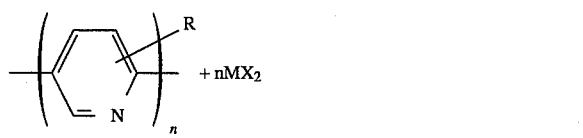

Therefore, the polymer having the chemical formula 6 can be obtained by reducing a 2,5-dihalogenated alkylpyridine, with an equimolar amount or excess of a Mg or Zn in the presence of a divalent nickel compound, as shown in the formula (22) and followed by the formula (14)–(16).

The above nickel compounds which have been synthesized and isolated prior to the polymerization reaction can be used. Alternatively, those synthesized from nickel or a nickel compound in an electrolytic cell can be used directly as they are in the cell. As such a nickel compound, mention may be made of, for example, tris(2,2'-bipyridine)nickel(II) bromide [Ni(bpy)$_3$]Br$_2$, dibromobis(triphenylphosphine)nickel(II) [NiBr$_2$(PPh$_3$)$_2$] or the like.

There is no limit to these polymerization reaction conditions, however, from a point of raising a yield and molecular weight, it is preferable that polymerization is carried out under conditions of substantially no water and no oxygen.

The present invention will be explained more concretely and detailedly by way of example hereinafter.

EXAMPLE 1

0.99 g of a bis(1,5-cyclooctadiene) nickel complex [Ni(cod)$_2$] (3.6 mmol) was dissolved in 30 ml of N,N-dimethylformamide (hereinafter referred to as "DMF"), and 0.56 g of 2,2'-bipyridine (bpy) (3.6 mmol) and 0.39 g of 1,5-cyclooctadiene (cod) (3.6 mmol) were added thereto. To this solution was dropped 0.96 g of 6-hexyl-2,5-dibromopyridine (3.0 mmol) solved in 20 ml of a DMF solution, thereafter reacted at a reaction temperature of 60° C. for 48 hours, and polymerized. As a polymerization proceeds, there was produced an ocher-colored precipitate of a poly(alkylpyridine-2,5-diyl) polymer. After completion of the reaction, the precipitate was filtered and recovered, and washed with the use of the following materials (a) to (e) several times, and the polymer was refined. (a) ammonia water (29%), (b) methyl alcohol, (c) a warm aqueous solution of sodium ethylenediaminetetraacetic acid (prepared to pH=3), (d) warm water and (e) methyl alcohol.

After washed, the precipitate was vacuum-dried to obtain 0.40 g of ocher-colored powder of poly(alkylpyridine-2,5-diyl). A yield of the polymer was 80%.

The infrared absorption spectrum of this polymer is shown in FIG. 1. There is observed absorption derived from C-H stretching vibration of a pyridine ring at 3030 cm$^{-1}$, C-H stretching vibration by a side chain hexyl group at 2850–2950 cm$^{-1}$, skeletal vibration of a pyridine ring and deformation vibration of a side chain methylene group at 1580, 1460 and 1420 cm$^{-1}$, and C-H out-of-plane deformation vibration of a pyridine ring at 830 cm$^{-1}$.

Moreover, FIG. 2 shows $^1$H-NMR in CDCl$_3$ of the polymer. There is observed absorption derived from a side chain hexyl group at δ=0.8–3.2 ppm (inside standard: tetramethylsilane) and hydrogen of a pyridine ring at δ=7.32–8.5 ppm. An area ratio of respective peaks was about 13:2. Moreover, element analysis values of the obtained polymer were 80.3% of carbon, 8.9% of hydrogen, 8.9% of nitrogen and 0.0% of bromine.

The result of the infrared absorption spectrum $^1$H-NMR and element analysis supports that the polymer has the following structure.

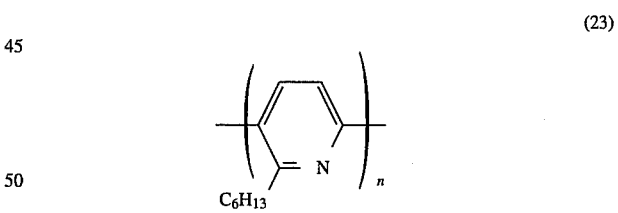

(23)

where, n shows a degree of polymerization.

Poly(pyridine-2,5-diyl) and its methyl derivative were only soluble in formic acid as an organic solvent, while the above polymer has a long-chain alkyl group as a side chain, so that it was soluble in not only formic acid but also general organic solvents shown below. That is, the polymer was soluble in chloroform (solubility of about 300 mg/ml), tetrahydrofuran (THF) (solubility of about 300 mg/ml), benzene (solubility of about 300 mg/ml), toluene (solubility of about 300 mg/ml), cresol and N-methylpyrrolidone (NMP), and partly soluble in diethyl ether. A cast film was tried to prepare from a formic acid solution of poly(pyridine-2,5-diyl), but a strong film could not be obtained, while a cast film was prepared from said solution of the present polymer, and a strong and ocher-colored free standing film was obtained.

When a molecular weight of this polymer was measured in a formic acid solution by a light scattering method, a weight-average molecular weight was 37000 (degree of polymerization 230) which was higher than the weight-average molecular weight 3800 (degree of polymerization 49) of poly(pyridine-2,5-diyl). Moreover, in case of measuring the molecular weight, even when a chloroform solution was used as solvent instead of formic acid, the weight-average molecular weight observed in chloroform was substantially the same as that observed in formic acid.

The ultraviolet visible absorption spectrum of said polymer showed a sharp absorption peak at about 340 nm in a formic acid solution and at about 320 nm in either one of a chloroform, THF, benzene, toluene or NMP solution. Moreover, said polymer showed a high thermal stability.

As a result of thermogravimetric analysis under nitrogen, weight reduction was observed from the proximity of 300° C. and was about 50% at 900° C.

EXAMPLE 2

A chloroform solution of the poly(alkylpyridine-2,5-diyl) obtained in Example 1 was applied onto a platinum plate, and chloroform was removed to prepare a film of the polymer. With respect to this polymer film, cyclic voltammogram was measured in an acetonitrile solution containing 0.1 mol/l of $[(C_2H_5)_4N][ClO_4]$. As a result, it was found in the polymer that a cation is doped (n-type doping) for $Ag/Ag^+$ at about $-2.50$ V, and dedoped at about $-2.45$ V (potential for $Ag/Ag^+$) in sweeping in the reverse direction. In case of doping, the color of the polymer film was changed from ochre to deep red orange, and in case of dedoping, discoloration went by contraries.

Thus, the present polymer is possible to be electrochemically reduced, that is, electrochemical n-type doping, and together with doping, electrochromic property was shown. It is shown from the above that the present polymer is usable as battery electrode material and electrochromic element material.

When this electrochromic phenomenon was further compared with that of the other polypyridine derivative, poly-(pyridine-2,5-diyl) was discolored from yellow to red orange, and poly(methylpyridine-2,5-diyl) was discolored from yellow to dark blue. It was found from this fact that coloration of a film at the time of doping depends upon alkyl chain length of a side chain.

EXAMPLE 3

A formic acid solution and a chloroform solution of poly(alkylpyridine-2,5-diyl) obtained in the example 1 were prepared. The polymer was contained in each solution in a concentration of $2.0 \times 10^{-5}$ mol/l of its unit structure. Fluorescence spectra were measured about the solutions at an excitation wavelength of 310 nm. As a result, luminescence was observed at 420 nm in the formic acid solution and at 360 nm in the chloroform solution.

As described above, the polymer is capable of radiating fluorescence. Therefore, the polymer may be utilized as a material for an electroluminescence device.

EXAMPLE 4

1.6 g of 6-hexyl-2,5-dibromopyridine (5.0 mmol) was dissolved into 15 ml of tetrahydrofuran (THF), 0.13 g of a piece of metal magnesium (5.5 mmol) was added into the resulting solution. After the solution was heated and refluxed for 10 hours, dichloro[1,2-bis(diphenylphosphino)ethane] nickel(II) $NiCl_2$ (dpe) (5 mg, 0.01 mmol) was added into the heated solution, which was then heated and refluxed for 13 hours. After the reaction was completed, the reaction solution was poured into diluted hydrochloric acid containing ices, the resulting mixture was neutralized by adding water containing $Na_2CO_3$. The polymer was recovered by filtration and was washed with water and ether, and further washed with warm water solution containing ethylenediaminetetraacetic acid disodium salt. The resulting polymer was then vacuum dried and 0.50 g of poly(alkylpyridine-2, 5-diyl) was obtained. The yield of the polymer as 60%.

EXAMPLE 5

0.13 g of 6hexyl-2,5-dibromopyridine (5.0 mmol) was dissolved into 5 ml of hexamethylphosphoric triamide (HMPA), a powder of zinc (0.98 g, 15 mmol) was added into the resulting solution which was then heated to 100° C. Then, 60 mg of dibromo [1,2-bis(diphenylphosphino)ethane]nickel(II) $NiBr_2$ (dpe) (0.1 mmol) was added into the heated solution and reacted at 140° C. for 17 hours. After the reaction was completed, the reaction solution was poured into diluted hydrochloric acid containing ices, the resulting mixture was alkalified by adding ammonia water and the polymer was recovered by filtration.

The above polymer was washed with methyl alcohol, water solution containing ethylenediaminetetraacetic acid disodium salt and then vacuum dried. 0.40 g of poly(alkylpyridine-2,5-diyl) was obtained.

EXAMPLE 6

0.3 mmol of 6-hexyl-2,5-dibromopyridine, 0.15 mmol of tris (2,2'-bipyridine) nickel(II) bromide ($[Ni(bpy)_3]Br_2$) and 3.75 mmol of tetraethylammonium perchlorate $[(C_2H_5)_4N][ClO_4]$ were dissolved into 15 cm$^3$ of N,N-dimethylformamide to prepare an electrolytic solution. This solution was filled into an electrolytic bath in which a platinum plate (1×2 cm=2 cm$^2$) was arranged as a cathode, a platinum plate (1×2 cm=2 cm$^2$) was arranged as an anode and a silver electrode was arranged as a reference electrode. Then, an electrolytic polymerization was carried out at a polymerization temperature of 60° C., at an electrolytic potential of $-1.7$ V (the potential was for $Ag/Ag^+$ which is same in the following description) and for 16 hours to provide a film consisting of a ocher-colored polymer on the anode. This crude polymer was collected and purified using the following substances (a) to (e) by washing the polymer with the substances (a) to (e) in the following order, the crude polymer was washed several times by each substance.

(a) water containing ammonia (29%), (b) methyl alcohol, (c) warm water solution containing ethylenediaminetetraacetic acid disodium salt (its pH was 3), (d) warm water, (e) methyl alcohol.

After the above washing step, the polymer was vacuum dried and ocher-colored poly(alkylpyridine-2,5-diyl) was obtained.

What is claimed is:

1. A process of producing a battery, comprising:
   fabricating at least one constituent of the battery from a polymer comprised of poly(alkylpyridine-2,5-diyl) having a chemical formula:

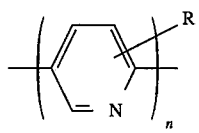

wherein R is an alkyl group having not less than 3 carbon atoms, and n is a degree of polymerization and is not less than 30.

2. The process as claimed in claim 1, wherein R is an alkyl group having 4 to 20 carbon atoms and n is a degree of polymerization and is not less than 30.

3. The process as claimed in claim 2, wherein R is an alkyl group selected from the group consisting of a hexyl group, a pentyl group, an octyl group, a decyl group, and a dodecyl group.

4. A process of producing an electrochromic device, comprising:

fabricating at least one constituent of the electrochromic device from a polymer comprised of poly(alkylpyridine-2,5-diyl) having a chemical formula:

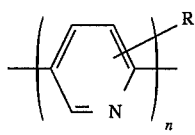

wherein R is an alkyl group having not less than 3 carbon atoms, and n is a degree of polymerization and is not less than 30.

5. The process as claimed in claim 4, wherein R is an alkyl group having 4 to 20 carbon atoms and n is a degree of polymerization and is not less than 30.

6. The process as claimed in claim 5, wherein R is an alkyl group selected from the group consisting of a hexyl group, a pentyl group, an octyl group, a decyl group, and a dodecyl group.

7. A process of producing an electronic device, comprising:

fabricating at least one constituent of the electronic device from a polymer comprised of poly(alkylpyridine-2,5-diyl) having a chemical formula:

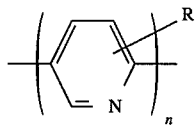

wherein R is an alkyl group having not less than 3 carbon atoms, and n is a degree of polymerization and is not less than 30.

8. The process as claimed in claim 7, wherein R is an alkyl group having 4 to 20 carbon atoms and n is a degree of polymerization and is not less than 30.

9. The process as claimed in claim 8, wherein R is an alkyl group selected from the group consisting of a hexyl group, a pentyl group, an octyl group, a decyl group, and a dodecyl group.

10. A process of producing an n-type conductor device, comprising:

fabricating at least constituent of the n-type conductor device from a polymer comprised of poly(alkylpyridine-2,5-diyl) having a chemical formula:

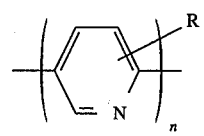

wherein R is an alkyl group having not less than 3 carbon atoms, and n is a degree of polymerization and is not less than 30.

11. The process as claimed in claim 10, wherein R is an alkyl group having 4 to 20 carbon atoms and n is a degree of polymerization and is not less than 30.

12. The process as claimed in claim 11, wherein R is an alkyl group selected from the group consisting of a hexyl group, a pentyl group, an octyl group, a decyl group, and a dodecyl group.

13. A process of producing an electroluminescent device, comprising:

fabricating at least one constituent of the electroluminescent device from a polymer comprised of poly(alkylpyridine-2,5-diyl) having a chemical formula:

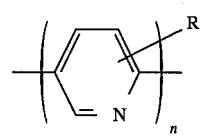

wherein R is an alkyl group having not less than 3 carbon atoms, and n is a degree of polymerization and is not less than 30.

14. The process as claimed in claim 13, wherein R is an alkyl group having 4 to 20 carbon atoms and n is a degree of polymerization and is not less than 30.

15. The process as claimed in claim 14, wherein R is an alkyl group selected from the group consisting of a hexyl group, a pentyl group, an octyl group, a decyl group, and a dodecyl group.

* * * * *